United States Patent

[11] 3,593,375

| [72] | Inventor | James W. Hendry<br>Helena, Ohio |
|---|---|---|
| [21] | Appl. No. | 766,926 |
| [22] | Filed | Oct. 11, 1968 |
| [45] | Patented | July 20, 1971 |
| [73] | Assignee | Borg-Warner Corporation<br>Chicago, Ill. |

[54] PLASTICIZING AND WORKING MACHINE
14 Claims, 9 Drawing Figs.

[52] U.S. Cl. .......................................... 18/12,
18/30
[51] Int. Cl. ..................................... B29f 3/00
[50] Field of Search .......................... 18/12 B, 12
DR, 12 SV, 12 SE, 12 SZ, 2 EM, 30 JT, 30 AF, 30
JM, 30 JS, 30, 30 SR; 264/329, 349; 259/21—24

[56] References Cited
UNITED STATES PATENTS

| 1,657,132 | 1/1928 | Merle | 18/12 (DR) |
| 2,763,896 | 9/1956 | Vogt | 18/2 (EM) X |
| 2,813,302 | 11/1957 | Beck | 18/12 (SE) X |
| 3,008,187 | 11/1961 | Slade | 18/12 (DR) |
| 3,045,283 | 7/1962 | Keiser | 18/30 (JS) |
| 3,149,377 | 9/1964 | Morse | 18/30 (JS) |
| 3,239,882 | 3/1966 | Yokana | 18/12 (SE) |
| 3,278,986 | 10/1966 | Welt | 18/12 (SZ) |

FOREIGN PATENTS

| 476,748 | 5/1929 | Germany | 18/12 (SE) |

*Primary Examiner*—H. A. Kilby, Jr.
*Attorney*—Woodhams, Blanchard and Flynn

ABSTRACT: A plasticizing machine including therein a rotatable plasticizing spinner. The spinner includes a tapered portion against which plastic material is urged under a positive pressure to effect an initial heating thereof. The base of the tapered portion is connected to a working portion which comprises an elongated cylindrical member having a plurality of axially spaced, annular ridges thereon. The working portion is surrounded by a substantially cylindrical housing so as to define a passage therebetween having a plurality of axially spaced gaps of small radial extent whereby the material passing through the gaps is folded and mixed.

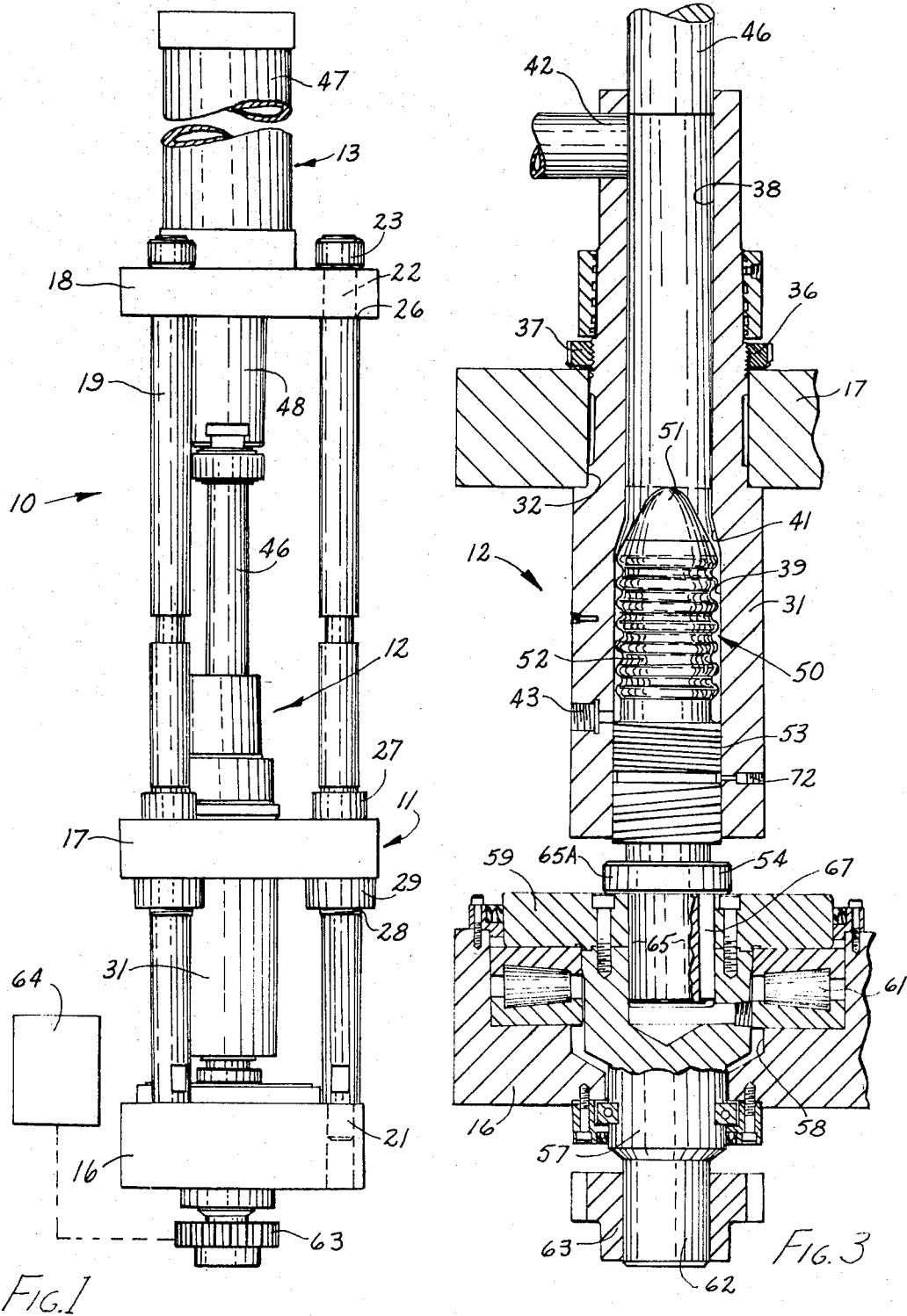

3,593,375

PLASTICIZING AND WORKING MACHINE

FIELD OF THE INVENTION

This invention relates to a plasticizing machine utilizing a plasticizing rotor therein and more particularly relates to a plasticizing machine utilizing a plasticizing spinner having a plurality of axially spaced, annular ridges thereon.

BACKGROUND OF THE INVENTION

The present invention is a result of a continuing effort to improve the form and performance of plasticizing machines of the general type disclosed in my U.S. Pat. No. 3,358,334. This patent sets forth a plasticizing machine including a spindle, one end of which is tapered substantially from axis to periphery to form a cone rotatably disposed in a cylindrical opening in the machine housing. The end of the opening adjacent the conical end forms a conical seat which cooperates with the cone to frictionally work plastic material forced therebetween. Although the device of the aforementioned patent has so far proven highly desirable and advantageous, further research has shown the need for a machine having more flexibility and the ability to handle new materials which are becoming available. Also, there is a continuing need for a machine of improved performance characteristics, such as increased rate of production with utilization of less driving power.

Accordingly, the objects of this invention are:
1. To provide a plastic working machine having an improved plasticizing spinner.
2. To provide a machine, as aforesaid, wherein the spinner has a tapered portion and a working portion integrally formed on the base of the tapered portion with the working portion being substantially cylindrical and having a plurality of axially spaced smooth annular ridges thereon.
3. To provide a machine, as aforesaid, wherein a housing closely surrounds the working portion and cooperates with the annular ridges to provide a plurality of spaced annular gaps, which gaps preferably decrease in magnitude in the direction of material flow.
4. To provide a machine, as aforesaid, wherein the ridges are separated by annular grooves with the ridges and grooves being connected by smooth curves to form a substantially smooth and continuous undulating surface on the spinner.
5. To provide a machine, as aforesaid, in which the ridges and grooves are sized and spaced so as to cause the material upon passing through a gap to roll or be folded over as it moves into the adjacent groove so as to become thoroughly intermixed.
6. To provide a machine, as aforesaid, wherein the material is completely plasticized and intermixed to result in a high degree of homogeneity.
7. To provide a machine, as aforesaid, which is relatively inexpensive to construct and maintain, which is efficient in operation, which is compact, and which is substantially self-cleaning in operation for allowing long continuous periods of running without stopping.

Other objects and purposes of this invention will be apparent to persons acquainted with apparatus of this general type upon reading the following specification and inspecting the accompanying drawings.

BRIEF DESCRIPTION OF THE DRAWINGS

FIG. 1 is a side elevational view of a machine embodying the spinner of the present invention.

FIG. 3 is a broken, partial cross-sectional view of the machine illustrated in FIG. 1.

Figure 4:
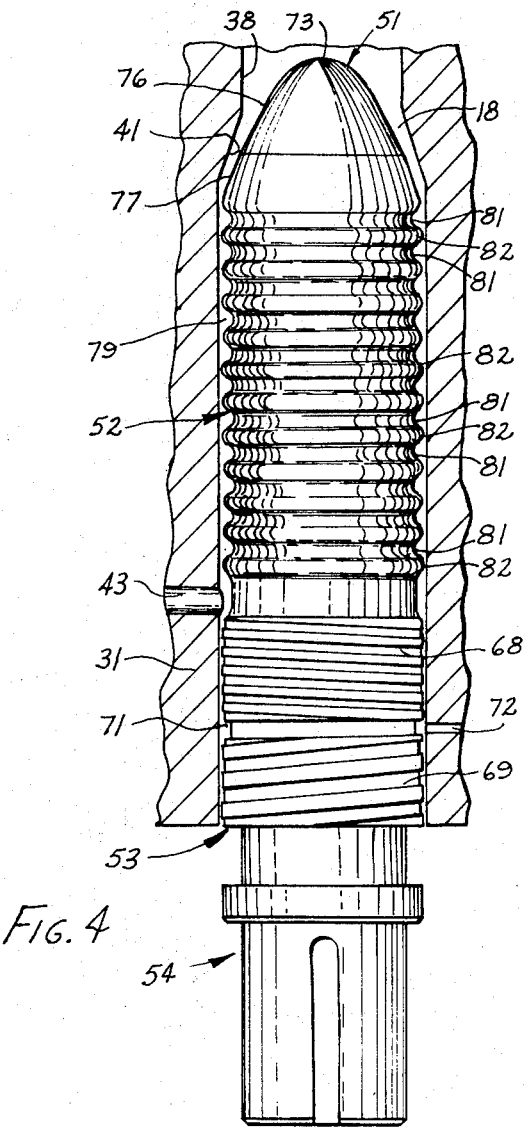
FIG. 4 is an enlarged view of the spinner.

Certain terminology will be used in the following description for convenience in reference only and will not be limiting. The words "upwardly," "downwardly," "rightwardly" and "leftwardly" will designate directions in the drawings to which reference is made. The work "forwardly" will refer to the normal direction of material flow through the device, such direction being downwardly as seen in FIGS. 3 and 4. The words "inwardly" and "outwardly" will refer to directions toward and away from the geometric center of the device and designated parts thereof. Such terminology will include the words above specifically mentioned, derivatives thereof and words of similar import.

SUMMARY OF THE INVENTION

In general, the objects and purposes of this invention are met by providing a machine for frictionally working plastic material, the machine including a housing having a chamber extending axially therethrough and a spinner positioned within the chamber. Drive means are provided for rotatably driving one of the spinner and housing, preferably the spinner, with respect to the other and for supporting the spinner within the chamber against radial and axial loads. The spinner is formed with a tapered nose portion, the base of which is connected to a substantially cylindrical working portion which is surrounded by a substantially cylindrical wall formed by the chamber of the housing. Either the working portion of the spinner or the housing, preferably the spinner, has a plurality of axially spaced annular raised portions formed thereon, which raised portions define a plurality of small annular gaps. Annular grooves are provided between the gaps for allowing material to be fed through the gaps so as to be frictionally worked hereby the material is completely plasticized and achieves a smooth and homogeneous consistency. Positive feed means are provided to feed plastic material for plasticizing under a positive pressure to the plasticizing means.

DETAILED DESCRIPTION

The plastic working machine 10 embodying therein a preferred form of the invention includes a housing 11 which supports therein the plasticizing and working device 12, which device is supplied with particulate plastic material by a feed means 13.

Figure 2:
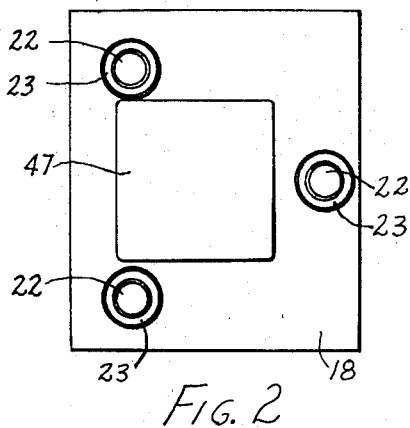
FIG. 2 is a top view of the machine illustrated in FIG. 1.

While the housing 11 may comprise any convenient means, same is illustrated in FIGS. 1 and 2 as including a base plate 16 and a pair of laterally spaced support plates 17 and 18 interconnected by a plurality of rod members 19. One end of each of the rod members 19 is provided with a threaded portion 21 thereon threadedly engaged within threaded openings formed in the base plate 16. The rod members are provided with reduced portions 22 on the other end thereof which extend through openings formed in the support plate 18 with the support plate being fixedly secured to the rod members by being held between the nut 23 and the shoulder 26. The support plate 17 is fixedly positioned intermediate the base 16 and the support plate 18 by being fixedly secured between shoulder portions 27 formed on the rods and nuts 29 which are threadedly engaged on intermediate threaded portions 28 also formed on the rods.

The housing 11 further includes a barrel 31 which has a reduced portion which is positioned in and extends through an opening 32 formed in the support plate 17, the barrel being axially positioned by means of a shoulder 33 formed thereon in abutting engagement with one side of the support plate 17. The barrel 31 has a threaded portion 36 which receives a nut 37 thereon, which nut is rotated into tight abutting engagement with the other side of the support plate 17 for fixedly securing the barrel 31 relative to the support plate 17. The barrel 31 has a pair of coaxial cylindrical openings 38 and 39 formed therein, which openings are in this embodiment of slightly different diameter and are interconnected by means of a tapered seat 41, thereby forming an elongated chamber which extends throughout the length of the barrel. A feed opening 42 extends through the sidewall of the barrel 31 adjacent one end thereof in communication with the cylindrical opening 38, while a discharge opening 43 extends through the sidewall of the feed barrel adjacent the other end thereof in communication with the cylindrical opening 39. The purpose of these openings will be explained hereinafter.

Mounted directly adjacent one end of the barrel 31 is the feed means 13 which includes a reciprocating power means 47, preferably in the form of a fluid pressure cylinder which in this case is hydraulically actuated. The fluid pressure cylinder 47 is fixedly secured to the support plate 18 and has a piston rod 48 which slideably extends therefrom through an opening formed in the support plate 18, the lower end of the piston rod being connected to a ram 46 which extends into and is slideably received within the cylindrical opening 38. The ram 46 is movable between a retracted position illustrated in solid lines in FIG. 3, wherein the feed opening 42 is uncovered, and an extended position illustrated in dotted lines in FIG. 3, wherein the ram 46 closes the feed opening 42 and is positioned closely adjacent the plasticizing and working device 12.

As illustrated in FIG. 3, the plasticizing and working device 12 generally comprises a rotor or spinner 50 which is supported in and is rotatable relative to the housing 11. The spinner 50 preferably includes thereon four basic portions which, for convenience, will be referred to as the tapered portion 51, the working portion 52, the seal portion 53 and the support portion 54.

Considering first the manner in which the spinner 50 is in this embodiment rotatably supported in the housing, there is provided a drive hub 57 which is positioned in and extends through a recess 58 formed in the base plate 16. The drive hub 57 is rotatably supported relative to the base plate 16 by means of a combination thrust and radial roller bearing 61. One end of the drive hub 57 has a thrust plate 59 fixedly secured thereto in bearing engagement with the roller bearing 61, while the other end of the hub is provided with a stub shaft 62 to which is suitably secured any type of drive means, such as a gear member 63. Gear member 63 is in turn rotatably driven by any convenient means, such as a motor or drive unit 64.

The support portion 54 of the spinner 50 is connected to the drive hub 57 by means of a shaft extension 65 which extends into a recess 66 formed within the drive hub 57, the shaft extension 65 being nonrotatably secured to the drive hub 37 by means of a key 67. The shaft extension 65 is further provided with an integral thrust flange 65A formed thereon, which flange axially bears against the thrust plate 59 so as to transmit axial thrust loads from the spinner 50 through the thrust plate 59 and the bearing 61 to the housing 11.

The support portion 54 of the spinner (see FIG. 4) is fixedly, here, integrally, connected to the seal portion 53 and includes a pair of helical threads 68 and 69 of shallow rectangular cross section formed therein. The threads 68 and 69 are of opposite hand and are spaced from one another by a small annular groove 71. The hand of the thread 68 and the direction of rotation of the spinner 50 are so related that the thread 68 will tend to urge downwardly (in FIG. 4) a small amount of plastic material to assist in lubricating the spinner and to seal the end of the barrel 31. In the particular embodiment shown, the thread 68 is a left-hand thread and the preferred rotational direction of the spinner is clockwise as seen from the bottom end thereof in FIG. 4 whereupon the thread 68 thus tends to urge a small quantity of plastic material through the thread toward the shallow groove 71. A waste outlet 72 formed in the barrel 31 extends outwardly from the groove 71 to allow for escape of whatever plastic material is moved downwardly as above mentioned. Since the hand of the thread 69 is opposite that of the thread 68, the thread 69 will tend to maintain the material within the groove 71 and will prevent the material from escaping form the bottom end of the barrel 31.

Figure 7:
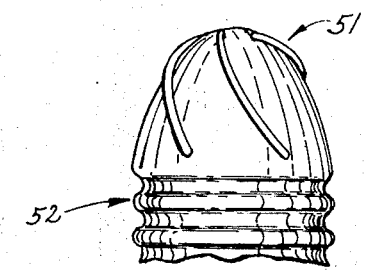
FIGS. 7—9 are fragmentary views illustrating modifications.

Considering now the tapered portion 51 of the spinner 50, same is positioned within the barrel 31 in close proximity to the tapered seat 41 formed therein. The tapered portion is provided with a rounded nose 73 which partially extends into and faces the cylindrical opening 38 containing the ram 46 therein, said nose being shown as smooth in FIGS. 3 and 4 but which may be ribbed if desired as shown in FIG. 7. Said ribs of course may be of any shape, such as being angled as shown to assist in drawing material into the plasticizing zone or they may be arranged parallel to the axis of the rotor in which case there will be no propelling effect but merely agitating. Further, as illustrated in FIG. 4, the tapered portion is formed with first and second tapered surfaces 76 and 77 thereon, which surfaces as illustrated are conical and are of slightly different slopes. For example, the first conical surface 76 forms an included angle of approximately 30° with respect to the rotational axis of the spinner, while the second conical surface 77 forms an included angle of approximately 20° with respect to the rotational axis of the spinner. The first and second surfaces 76 and 77 are positioned closely adjacent to and slightly spaced from the surrounding tapered seat 41, which is also conical in the illustrated embodiment, so as to define a narrow annular passage or zone 78 therebetween, which zone 78 constitutes an initial heating zone.

While the spinner of the present invention has been disclosed as utilizing two conical surfaces of different slopes thereon, the tapered portion of the spinner could have a nonconical surface or only a single conical surface formed thereon in substantially the same manner as disclosed in my prior U.S. Pat. No. 3,358,334. Also, the seat 41, if utilized, is preferably formed with a slope or configuration thereon which is, at least within a matter of a few degrees, substantially equal to the slope or configuration formed on the spinner. However, it is preferable to use slightly different slopes or configurations between the spinner and the seat so that the annular zone 78 will decrease in radial thickness in the normal direction of material flow, whereby the cross-sectional area of the heating zone 78 throughout the axial length thereof remains substantially constant or decreases slightly in the normal flow direction. Further, if desired, the seat 41 in close surrounding relationship to the tapered portion 51 can be eliminated as disclosed and illustrated in copending application Ser. No. 712,175, filed Mar. 11, 1968.

Figure 8:
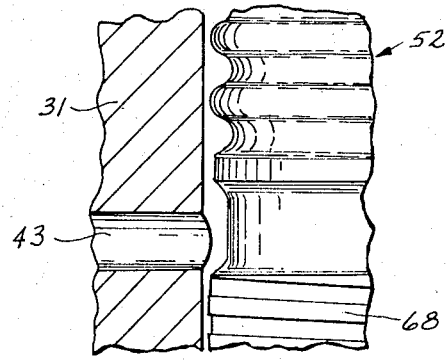

The base of the tapered portion 51 is fixedly, here integrally, connnected to the working portion 52, which portion is substantially cylindrical and has a plurality of axially spaced, annular grooves 81 formed on the periphery thereof. Each pair of adjacent grooves 81 forms an annular ridge 82 therebetween. The detailed configuration of the working portion 52 and its relationship to the surrounding housing 11 is more clearly illustrated in FIG. 5 which is a partial cross-sectional enlargement of the ridges, referred to as 82A, 82B, 82C, etc., and of the grooves therebetween, referred to as 81A, 81B, 81C, etc. Each ridge 82 in the rotor of FIGS. 1—6 has a crest 83 formed with a smooth and rounded configuration but if preferred, one or more of the crests near the downstream end of the working portion 52 may, as shown in FIG. 8, be flat and of at least measurable axial extent. Further, ramps 86 and 87 of a smooth and arcuate configuration connect adjacent grooves 81 to the intermediate ridge 82 so that the working portion 52 will have a smooth but undulating surface configuration. In the embodiment illustrated in FIG. 3, the grooves 81 are formed with rounded bottom surfaces.

Figure 5:
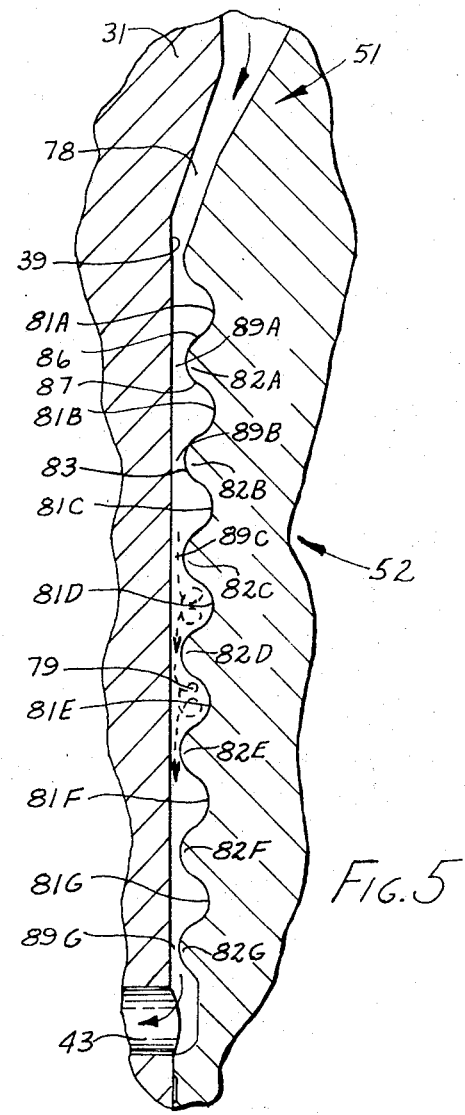
FIG. 5 is an enlarged fragmentary view of the working portion of the spinner of FIG. 4 illustrating the in which the material flows therethrough.

As shown in FIG. 5, the cylindrical opening 39 formed in the feed barrel 31 is of substantially constant diameter throughout the axial length thereof and defines an annular working and plasticizing passage 79 which surrounds the periphery of the working portion 52. However, the diameter of the annular ridges 82 progressively increases in the normal direction of flow. That is, the first annular ridge 82A adjacent the base of the tapered portion is of a slightly smaller diameter than the next adjacent annular ridge 82B. Similarly, the annular ridge 82B is of slightly smaller diameter than the next adjacent annular ridge 82C. All of the annular ridges thus progressively increase slightly in diameter such that the last annular ridge 82G is of a larger diameter than any of the other annular ridges formed on the spinner. Due to the progressively increasing diameter of the ridges, the radial clearance gap 89A formed between the barrel 31 and the annular ridge 82A is of a slightly larger radial thickness than is the radial gap 89B, which in turn is of a slightly larger radial thickness than the gap 89C, the remainder of the gaps being of progressively decreasing radial thickness in the normal direction of flow whereupon the gap 89G is of a smaller radial thickness than any of the other gaps formed between the working portion 52 and the cylindrical opening 39. While the annular ridges are of progressively increasing diameter, the depth of the grooves 81 preferably remains substantially constant throughout the axial length of the spinner and thus the root diameter of the spinner progressively increases throughout the axial length from the tapered portion 51 to the seal portion 53.

While it is preferable to form the annular ridges 82 with progressively increasing diameters so as to result in progressively decreasing radial gap widths, it will of course be obvious that the spinner of the present invention could be formed with a plurality of substantially equal diameter annular ridges thereon whereupon the gaps would all be of substantially the same width. While such a configuration would result in an efficient plasticizing operation, the use of a plurality of gaps of decreasing radial widths is preferred since causing the material to pass through progressively smaller gaps insures that the very small particles are completely plasticized and mixed within the plastic mass. This results in a moldable plastic mass having a high degree of consistency and homogeneity.

Figure 9:
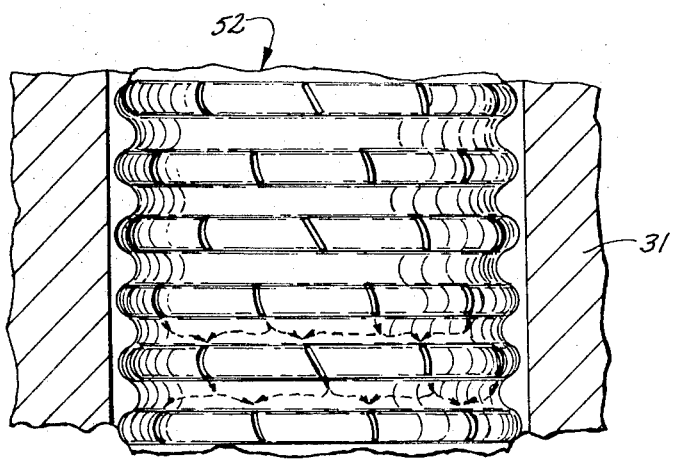

If desired, to improve the flow of plastic material through the working portion 52, slots as shown in FIG. 9 may be cut through the ridges 82. Said slots may be oriented to assist axial flow of plastic material, to oppose same, or they may be parallel to the axis of the rotor. In any event, if used, they will normally be staggered as shown in FIG. 9 with respect to each other to assure some circumferential flow between adjacent ridges, as shown by the broken lines in FIG. 9, and to prevent channeling.

OPERATION

The operation of the device embodying the invention will be described in detail hereinbelow for a better understanding of the invention.

Assuming the ram 46 to be in its retracted position and assuming that particulate plastic material (cold or only slightly preheated for too much preheating will cause same to stick to the ram) is supplied through the feed opening 42 into the cylindrical opening 38, the power cylinder 47 will then be energized so as to move the ram 46 forwardly through the opening 38 so as to force the particulate plastic material into contact with the nose portion 73 of the spinner 50. The drive motor 64 may be energized either when, or before the ram 46 is moved, the drive motor 64 rotating the spinner 50 at a preselected speed which may be constant or variable as desired. As the ram 46 moves the particulate plastic material forwardly along the opening 38, some of the material is pressed against the nose 73 of the spinner and is moved into the annular zone 78 surrounding the tapered portion 51. As the material is moved into the annular zone 78, the relative rotation of the housing and spinner tends to initiate frictional working of the material to a small degree.

As further material is forced by the ram 46 into the annular zone 78, frictional working of the particles of material is greatly increased and the particles are heated as the material flows radially outwardly through the annular passage 78. The material upon leaving the annular zone 78 flows into the annular passageway 79 which surrounds the working portion 52 of the spinner with the material then flowing axially through this annular passageway until reaching the discharge opening 43, whereupon the material is discharged to some external device, such as an injection molding device.

As the material passes through the annular passage 78, the particles are frictionally heated and thus, upon leaving the passage 78, the material may be substantially in the form of softened particles. Alternatively, the material leaving passage 78 may be partially or substantially completely plasticized. The exact condition of the material leaving the zone 78 is primarily dependent upon the amount of frictional heat generated within the zone 78, which in turn is dependent upon several different variables, such as the relative rotational speed between the spinner and the housing, the positive pressure applied to the material within the zone 78, and the exact configuration of the zone 78, particularly the radial width thereof.

The material leaving the annular passage 78 adjacent the first annular ridge 82A thus generally contains at least occasional plastic particles which are only softened or partially plasticized. Further, the material leaving the annular passage 78 may not be of a very homogeneous nature since the material sometimes undergoes less than sufficient mixing as it travels radially outwardly through the annular passage 78. Thus, the material upon entering the working passage 79 is not necessarily completely plasticized nor of a desired homogeneity.

As the material passes into the annular working and plasticizing zone 79, it is successfully forced through the series of axially spaced gaps 89 whereupon the relative rotation between the spinner and the housing causes further additional frictional working and plastification of any remaining unplasticized particles contained in the mass of material. Further, where the gaps are of progressively decreasing width, additional assurance is obtained that even the smallest particles are completely plasticized by the time the material reaches the discharge opening 43. Also, the narrow gaps necessarily cause the material to be redistributed and accordingly results in more intermixing of the material so as to result in a more homogeneous consistency.

Figure 6:
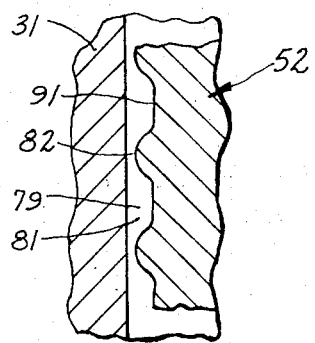
FIG. 6 is an enlarged view similar to FIG. 4 and illustrating a modified configuration of the spinner.

The homogeneity of the material is further increased by providing the enlarged grooves 81 between the ridges 82. As schematically illustrated by the dotted arrows in FIG. 5, as the material passes through a gap into the adjacent groove, the material tends to roll in the direction of movement whereupon some of he material is folded back adjacent other portions of the material positioned slightly therebehind whereby the material thus becomes folded and intermixed such that the material, upon reaching the discharge opening 43, is of a highly homogeneous nature. Further, assuming that the ridges 82 are not provided with sharp crests thereon or that the grooves 81 are not too deep in relationship to the height of the ridges 82, the rolling movement of the material as it passes through the grooves 81 tends to maintain the grooves clean and thus prevents the accumulation of material within the grooves, which accumulation would result in deterioration or charring of the material and thus destroy the useability of the material for most commercial applications. By making the bottom surface of the grooves 81 rounded as illustrated in FIG. 5, the material tends to roll throughout the length of the groove until reaching the next adjacent ridge. However, if desired, the grooves 81 can be provided with flat bottoms 91 substantially as illustrated in FIG. 6. The use of a flat bottom is particularly desirable if the annular ridges 82 are axially spaced a substantial distance apart since use of a rounded bottom in this situation would require a substantially large depth between the bottom of the groove and the crest of the ridge, which depth would permit material to collect therein and thus contaminate the apparatus.

The preferred embodiment of the spinner has been disclosed above as possessing a smooth and undulating surface formed by a plurality of axially spaced ribs and grooves. However, it will be obvious that other undulating or irregular surface profiles could be utilized on the spinner, the only requirement being that the material flow along the periphery of the spinner so as to maintain continuous contact therewith and thereby not leave any voids or spaces would tend to become pockets of contamination.

As an example of a typical spinner utilizing annular ridges thereon, the spinner illustrated in FIG. 3 can be provided with eight grooves having a depth of 0.25 inch with the first annular ridge having a maximum diameter of 5.325 inches and the last annular ridge having a maximum diameter of 5.525 inches, the diameter of the intermediate ridges progressively changing in a linear manner. Further, the crest 83 formed on the ridges and the ramps 86 and 87 interconnecting the ridges to the adjacent grooves are all formed with a radius of approximately one-fourth inch and the adjacent ridges are axially spaced from one another by a distance of approximately 1.2 inches.

While the preferred embodiment of the invention as discussed above has utilized a plurality of axially spaced ridges of progressively increasing diameter so as to result in a series of gaps of decreasing width, it will be obvious that at least similar results could be achieved by forming all of the annular ridges 82 of substantially the same diameter, with the cylindrical opening 39 in the housing being tapered in a converging manner in the direction of material flow so as to result in a series of progressively decreasing gaps. Alternatively, the annular ridges could be formed on the internal periphery of the housing with the portion of the spinner confronting the ridges having a substantially smooth cylindrical periphery.

Although a particular embodiment of the invention has been disclosed for illustrative purposes, it will be understood that variations or modifications thereof which lie within the scope of the appended claims are fully contemplated.

The embodiments of the invention is which I claim an exclusive property or privilege are defined as follows:

1. A plasticizing apparatus, comprising:
    housing means having an opening formed therein;
    first working means mounted within said opening for rotation relative to said housing means, said first working means including a first rotor portion having a tapered surface thereon which increases in diameter from one end thereof toward the other end thereof, said housing means surrounding said first rotor portion and defining therebetween a first axially elongated annular passageway, said particular plastic material being fed into said first passageway adjacent the one end of said first rotor portion with said material being frictionally heated as same passes through said first passageway in a direction toward the other end of said first rotor portion;
    second working means mounted within said opening adjacent to and coaxially aligned with said first working means for rotation relative to said housing means, said second working means including a second rotor portion with said housing means surrounding said second rotor portion and being spaced therefrom to define a second axially elongated annular passageway therebetween;
    one of said housing means and second rotor portion having a plurality of axially spaced annular grooves formed in the periphery thereof with said annular grooves defining a plurality of axially spaced annular ridges therebetween, said ridges extending toward the confronting periphery of the other of said housing means and second rotor portion and defining a plurality of narrow axially spaced annular gaps therebetween, said plurality of axially spaced annular gaps progressively decreasing in radial dimension in the direction of material flow;
    drive means for rotating said first and second working means relative to said housing means; and
    feeding means for supplying particulate plastic material to said first and second working means, said material first being delivered to said first working means whereby same is frictionally heated, said material then being delivered to said second working means whereby same is completely plasticized and homogenized.

2. In combination, a plasticizing apparatus including a housing having an opening formed therein, plasticizing rotor means rotatably disposed within said opening and cooperating with said housing for plasticizing particulate plastic material primarily due to the generation of frictional heat energy, drive means for causing relative rotation between said rotor means and said housing, and feed means for supplying particulate plastic material to the rotor means for permitting frictional heating and plastification of said material, wherein the improvement comprises:
    said plasticizing rotor means including a tapered rotor portion which diverges in the direction of material flow, the tapered rotor portion being surrounded by the housing to define a first annular zone therebetween in which particulate plastic material is frictionally heated;
    said feeding means including a movable feed member for supplying particulate plastic material to the inlet end of said first annular zone;
    second drive means drivingly connected to said movable feed member for moving said feed member relative to and independently of the plasticizing rotor means for imposing a positive pressure on the plastic material within said first annular zone which is independent of the relative rotation between the rotor means and the housing; and
    means for generating additional frictional heat energy for at least additionally plasticizing and mixing the plastic material after it has passed through the first annular zone, said last-mentioned means including a first portion of the rotor means and a second portion on the housing in surrounding relationship to said first portion and defining a second axially elongated annular zone therebetween, said second annular zone being coaxially aligned and in communication with the discharge end of said first annular zone;
    one of said first and said second portions including a plurality of separate, axially spaced annular ridges defining a plurality of axially spaced annular grooves therebetween, the grooves and ridges defining a substantially smooth and continuous undulating peripheral surface located downstream of the tapered portion of the rotor means for permitting the plastic material to be additionally frictionally heated, mixed and plasticized.

3. The combination according to claim 2, wherein the axially spaced annular ridges are formed on the external periphery of the plasticizing rotor means.

4. The combination according to claim 18, wherein said ridges are provided with narrow slots cut thereacross, with the slots in axially adjacent ridges being circumferentially staggered to cause some circumferential flow of plastic material between adjacent ridges.

5. The combination according to claim 2, wherein said tapered rotor portion is formed with a rounded nose on the smaller diameter end thereof, and said movable feed member comprising a reciprocal ram slidably disposed within said opening in coaxial alignment with said rotor means, whereby said ram causes particulate plastic material to be pressed against the rounded nose of said tapered rotor portion.

6. The combination according to claim 2, wherein said opening as formed in said housing includes first and second elongated coaxial cylindrical portions and an intermediate tapered portion disposed between said first and second cylindrical portions, said first cylindrical portion being of smaller diameter than said second cylindrical portion, and said tapered rotor portion being coaxially disposed within said tapered portion of said opening.

7. The combination according to claim 6, wherein said tapered rotor portion is provided with a rounded nose thereon, and said movable feed member comprising a ram slidably disposed within said first cylindrical portion of said opening whereby said ram causes particulate plastic material to be pressed against the rounded nose of said tapered rotor portion.

8. The combination according to claim 2, wherein the axially spaced annular ridges formed on said one portion cooperate with said second portion so as to define a plurality of narrow, axially spaced, annular gaps which progressively decrease in radial dimension in the direction of material flow.

9. The combination according to claim 2, wherein at least a majority of the annular ridges are formed with rounded crests and at least a majority of the annular grooves are formed with rounded bottom surfaces so that the ridges and grooves form a smooth and continuous surface whereby the material as it passes over the crest of a ridge into an adjacent groove tends to roll in the direction of movement whereupon some of the material is folded back adjacent other portions of the material positioned slightly therebehind with the rolling of the material tending to maintain the groove clean and thus prevent accumulation of material within the groove.

10. A plasticizing apparatus as defined in claim 1, wherein:
one end of said second rotor portion is fixedly secured to the other end of said first rotor portion; and
said housing means further has a discharge opening formed therein in communication with the second annular passageway adjacent the other end of said second rotor portion.

11. A plasticizing apparatus as defined in claim 1, wherein:
said plurality of axially spaced grooves and ridges are formed on the periphery of said second rotor portion.

12. A plasticizing apparatus as defined in claim 11, wherein:
said plurality of axially spaced ridges progressively increase in diameter from the one end of said second rotor portion toward the other end of said second rotor portion whereby said second annular passageway contains said plurality of axially spaced gaps of progressively reduced radial dimension in the direction of material flow.

13. A plasticizing apparatus as defined in claim 1, wherein:
said feeding means includes a ram member slideably received within said opening substantially in coaxial alignment with said first rotor portion for feeding particulate plastic material adjacent the one end of said first rotor portion and into said first annular passageway, said feeding means further including power means for reciprocating said ram member.

14. A plasticizing apparatus as defined in claim 1, wherein:
said plurality of axially spaced annular grooves and annular ridges are substantially symmetrical in the axial direction of said second rotor portion and define a substantially smooth ans continuous undulating peripheral surface.

UNITED STATES PATENT OFFICE
CERTIFICATE OF CORRECTION

Patent No. 3,593,375     Dated July 20, 1971

Inventor(s) James W. Hendry

It is certified that error appears in the above-identified patent and that said Letters Patent are hereby corrected as shown below:

Column 1, line 74, insert "manner" before "in".
Column 2, line 8, change "work" to -- word --.
Column 2, line 36, change "hereby" to -- whereby --.
Column 3, line 48, change "37" to -- 57 --.
Column 8, line 24, change "of" to -- on --.
Claim 4, line 1, change "18" to -- 3 --.
Claim 14, line 5, change "ans" to -- and --.

Signed and sealed this 26th day of September 1972.

(SEAL)
Attest:

EDWARD M. FLETCHER, JR.
Attesting Officer

ROBERT GOTTSCHALK
Commissioner of Patents